Oct. 21, 1969  D. W. ERICKSON ET AL  3,473,548
ELECTROHYDRAULIC SERVO MECHANISM
Filed Dec. 19, 1966                                    2 Sheets-Sheet 1

INVENTOR.S
DONALD W. ERICSON
ERNEST C. THORNBER
BY
ATTORNEYS

INVENTORS
DONALD W. ERICSON
ERNEST C. THORNBER

United States Patent Office 3,473,548
Patented Oct. 21, 1969

3,473,548
ELECTROHYDRAULIC SERVO MECHANISM
Donald W. Erickson, 185 Westwood Drive, Birmingham, Mich. 48009, and Ernest C. Thornber, 818 Allston Road, Rochester, Mich. 48063
Filed Dec. 19, 1966, Ser. No. 602,660
Int. Cl. F15g 3/08
U.S. Cl. 137—85
12 Claims

ABSTRACT OF THE DISCLOSURE

An electrohydraulic servo valve of the type including a body member, a spool positioned in the body member for reciprocation in response to movement of a pilot member for metering fluid through the valve, a pilot member or nozzle tube reciprocally positioned within the opening in the spool and force motor means for moving the pilot member in accordance with an electrical signal applied to the servo valve and having a variable gain or movement characteristic is disclosed. The variable gain or movement characteristic is provided by spring means connected between the body member and nozzle tube and between the nozzle tube and spool which spring means may have different spring rates. Means are provided for adjusting the spring rate of the spring means between the body member and nozzle tube. The hysteresis of the force motor may be cancelled by the spring rate of the spring means.

---

In the past electrohydraulic servo valves have generally had a gain characteristic which was not variable or variable over only a small range. The gain characteristic of prior electrohydraulic servo valves has been fixed primarily by the physical characteristics of the valve portions thereof and the power limitations of the force motor portions thereof.

Since power limitations of the force motor portions of prior electrohydraulic servo valves has been a limiting factor in the gain characteristics of the valves, the force motors of the valves have often been driven to capacity and therefore have had a relatively low natural frequency and the stability and reliability of the valves has been less than desired. In addition because of the limited movement of the metering portions of prior electrohydraulic servo valves due to limited movement of the force motor metering member resulting from power limitations of the force motor, metering tolerances have been close and critical in prior electrohydraulic servo valves.

Where it has been attempted to provide an electrohydraulic servo valve having a variable gain characteristic in the past, the resulting valves have been undesirable for a number of different reasons. Thus, summing has sometimes been accomplished at low power levels and delicate connections have been made to the metering member of the force motor. Further variable gain electrohydraulic servo valves of the past were not always symmetrical so that they were affected by temperature shift. Additionally the electrohydraulic servo valves of the past have often been difficult to assemble and disassemble and have often included a plurality of parts which were not self centering.

It is therefore an object of the present invention to provide an improved electrohydraulic servo valve.

Another object is to provide an electrohydraulic servo valve having a gain characteristic variable over a relatively large range.

Another object is to provide an electrohydraulic servo valve as set forth above which is symmetrical to provide temperature compensation.

Another object is to provide an electrohydraulic servo valve as set forth above in which summing is accomplished at a high force level.

Another object is to provide an electro hydraulic servo valve as set forth above requiring less power input to the force motor to provide a given gain characteristic than previously necessary, whereby the natural frequency of the force motor is higher.

Another object is to provide an electrohydraulic servo valve as set forth above including feedback springs having a hysteresis effective to cancel out the hysteresis of the force motor.

Another object is to provide an electrohydraulic servo valve as set forth above wherein valve members have less critical metering tolerances.

Another object is to provide an electrohydraulic servo valve which is simple in construction so as to be easy to assemble and disassemble, economical to manufacture and efficient and reliable to use.

These and other objects will become more apparent as the description proceeds, especially when taken in conjunction with the figures of the drawings, wherein.

With particular reference to the figures of the drawings, one embodiment of the present invention will now be considered in detail.

Figure 1:
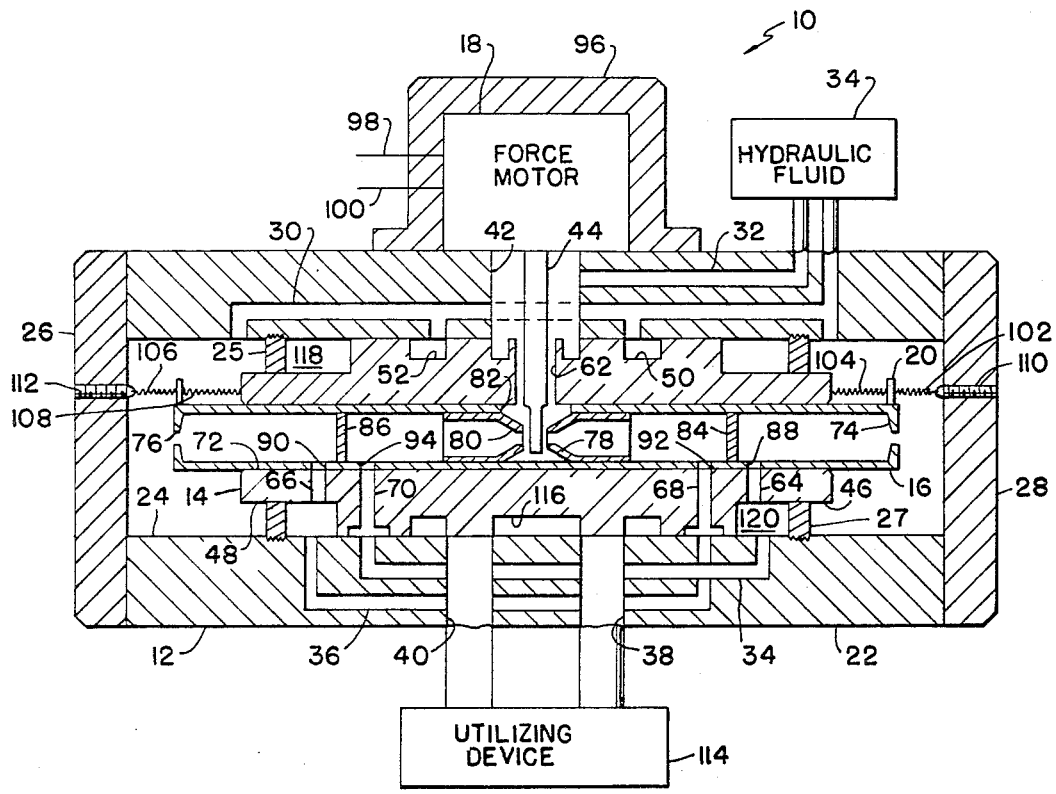
FIGURE 1 is a diagrammatic representation of an electrohydraulic servo valve in which the gain may be varied in accordance with the invention.

The electrohydraulic servo valve 10 of FIGURE 1 includes a valve body member 12, a spool 14 mounted in the body member 12 for metering hydraulic fluid therethrough in accordance with the position thereof, a nozzle tube 16 movable within the spool 14 for controlling the movement of the spool 14 in accordance with the movement thereof and a force motor 18 operable to produce a differential pressure across the nozzle tube 16 to produce movement of tube 16 in proportion to an electrical signal fed to the force motor. In addition the electrohydraulic servo valve 10 includes the structure 20 operable between the body member 12, spool 14 and nozzle tube 16 to provide variable movement of the spool 14 for a predetermined movement of the nozzle tube 16 to provide variable valve gain in accordance with the invention.

More specifically the body member 12 includes the central body part 22 having a cylindrical passage 24 extending therethrough in which the spool 14 is received between annular limiting abutments 25 and 27 and the two end caps 26 and 28 respectively secured to body part 22 by convenient means (not shown). High pressure hydraulic fluid inlet passage 30 and low pressure hydraulic fluid return passage 32 for connection to appropriate hydraulic fluid supply source 34 are provided extending through the body part 22, as shown in FIGURE 1.

Cross over passages 34 and 36 and hydraulic fluid passages 38 and 40 are also provided as shown in FIGURE 1 in the body part 22 of the valve body member 12 along with the transverse passage 42 through which the metering member 44 of the force motor 18 extends into the passage 24.

As shown in FIGURE 1 the spool 14 includes the reduced diameter ends 46 and 48 extending through the annular abutments 25 and 27 on the body part 22. The annular grooves 50 and 52 for metering hydraulic fluid under pressure from inlet passage 30 to the passages 38 and 40 and the annular groove 116 for connecting the passages 38 and 40 to the return passage 32 are also provided in the spool 14.

A transverse passage 62 is provided through the spool 14 through which the metering member 44 of the force motor 18 extends. Transverse metering passages 64 and 66 and 68 and 70 are also provided in the spool 14, as shown in FIGURE 1. An axial passage 72 is provided centrally of the spool 14 in which the nozzle tube 16 is received for axial movement with respect to the spool 14.

The nozzle tube 16 as shown is cylindrical and symmetrical as is the spool 14. The nozzle tube 16 is hollow and is provided with fixed orifices 74 and 76 at the opposite ends thereof and with metering nozzles 78 and 80 on opposite sides of a transverse central opening 82 therethrough, through which the metering member 44 of the force motor 18 extends into operative relationship with the nozzles 78 and 80. The nozzle tube portion between the fixed orifice 74 and nozzle 78 is partitioned by the central partition 84, while the portion of the nozzle tube between the fixed orifice 76 and the nozzle 80 is partitioned by the partition 86. Transverse openings 88, 90, 92 and 94 are provided in the nozzle tube 16, as shown in FIGURE 1, in alignment with openings 64, 66, 68 and 70, in spool 14 respectively.

The force motor 18 is positioned in housing 96 which is secured to the body part 22 of the valve body member 12 over the transverse opening 42. The force motor 18 is actuated by an electric signal passed thereto over the conductors 98 and 100. The metering member 44 of the force motor 18 is caused to move toward and away from the nozzles 78 and 80 in accordance with the magnitude and polarity of the signal supplied to the force motor over the conductors 98 and 100.

Such force motors are known items of commerce and will not therefore be considered in further detail herein. One such force motor is in fact available from Pegasus Laboratories Inc., Berkley, Mich.

The structure 20 for varying the gain of the electrohydraulic servo valve 10, as shown in FIGURE 1, includes a pair of springs 102 and 104 and 106 and 108 at the opposite ends of the valve 10. As shown, the spring 102 is connected between the end cap 28 of the valve body member 12 and the nozzle tube 16, while the spring 104 is connected between the nozzle tube 16 and the spool 14. Similarly the spring 106 is connected between the end cap 26 and the nozzle tube 16 while the spring 108 is connected between the nozzle tube 16 and the spool 14. Springs 102 and 106 have the same spring constant K-1, while the springs 104 and 108 have the same spring constant K-2. The mounting of the springs 102 and 106 to the end caps 28 and 26 is by means of adjustable screws 110 and 112 for centering purposes.

In operation of the electrohydraulic servo valve 10 illustrated in FIGURE 1, it is desired to meter a large quantity of hydraulic fluid through the passages 38 and 40 from the high pressure inlet passage 30 and to the return passage 32. That is to say, with the spool 14 in, for example, a leftward position, as shown in FIGURE 1, fluid would be passed through the passage 30 around the annular groove 50 in the spool and through the passage 38 to a utilizing device 114. At the same time fluid would pass out of the utilizing device 114 through the passage 40 around the annular groove 116, through the transverse passage 42, and back to the source of hydraulic fluid 34 through the return passage 32 of the valve 10.

With the spool 14 in the opposite position with respect to the openings 38 and 40, that is in a right position as shown in FIGURE 1, fluid will pass in the opposite direction through the valve 10 to be passed into the utilizing device 114 which may be a hydraulic piston and cylinder structure through the passage 40 and out of the utilizing device 114 through the passage 38.

When a predetermined balancing electric signal is fed to the force motor 18 over the conductors 98 and 100, as for example when the electric signal has a zero or center potential, no movement is imparted to the metering member 44. The metering member 44 is at this time equal distance from each of the nozzles 78 and 80. The hydraulic pressures in the valve 10 on each side of the metering member 44 are thus exactly balanced.

When an electric signal is received by the force motor 18 indicating a desired fluid flow to the utilizing device 114, the metering member 44 is caused to move toward one of the nozzles 78 and 80 and away from the other, as determined by the polarity of the signal fed to the force motor 18, a distance determined by the magnitude of the signal fed to the motor. Movement of the metering member 44 toward one of the nozzles 78 and 80 will produce a movement of the nozzle tube and spool 14 due to the differential pressure in the annular drive chambers 118 and 120 formed between the abutments 25 and 27 and the spool 14.

Such operation is not unusual. However, in prior electrohydraulic servo valves, the nozzle tube 16 is often secured to the spool 14 for movement therewith, whereby a one-to-one movement of the nozzle tube and spool is accomplished in accordance with the movement of the metering member 14 or flapper of the force motor 18. As pointed out above, the one-to-one fixed gain of the usual electrohydraulic servo valve is undesirable in that it fixes the amount of hydraulic fluid that can be metered through a given valve in accordance with the possible movement of the force motor metering member, so that the force motor is often run at its maximum power, whereby the natural frequency thereof is relatively low and the reliability and stability of the valve 10 is not as high as desired.

In accordance with the invention the movement of the nozzle tube resulting from a predetermined movement of the force motor metering member 44 is amplified through the springs 102 and 104 and 106 and 108 to provide substantially any desired relative movement of the spool 14 for a given movement of the nozzle tube. Ratios from one-to-one, up to as high as fifteen-to-one may be accomplished by selection of the spring rate of the springs 102, 104, 106 and 108.

Thus, in accordance with the know Equation 1 set forth below, the distance of axial travel Y of the spool 14 in the structure of the electrohydraulic servo valve 10 will be equal to the distance of the axial travel X of the nozzle tube 16 which is produced due to the movement of the metering member 44 of the force motor 18 times the sum of the spring rates K-1 and K-2 divided by the spring rate K-2. Simplified, we have Equation 2 set forth below, wherein Y is equal to X, times 1, plus the ratio of the spring rates.

$$Y = X \cdot \left(\frac{K_1 + K_2}{K_2}\right) \qquad (1)$$

$$Y = X \cdot \left(1 + \frac{K_1}{K_2}\right) \qquad (2)$$

From Equation 2 it can readily be seen that as K-1 and K-2 vary, the relative movement of the spool for a given movement of the nozzle tube will vary. Thus, for example, as K-1 is equal to K-2, the spool will move twice as far as the nozzle tube, while with the ratio of the spring rates K-1 and K-2, nine-to-one, the movement of the spool 14 may be ten times the movement of the nozzle tube 16.

Thus, in accordance with the invention there has been provided a variable gain electrohydraulic servo valve wherein the quantity of hydraulic fluid metered to a utilizing device in accordance with an electric signal fed thereto is determined by both the physical characteristics of the valve and the spring rates of springs 102, 104, 106 and 108.

With the electrohydraulic servo valve 10 the metering member 44 of the force motor 18 may be permitted to move a much smaller distance to meter the same quantity of hydraulic fluid whereby the natural frequency of the motor and thereby the reliability and stability of the valve 10 is increased. Further, since movement of the spool 14 can be greatly increased, the metering tolerances of the spool are not so critical. Also, it will be noted that the electrohydraulic servo valve construction illustrated in FIGURE 1 is particularly simple, economical and efficient, that the hysteresis of the springs cancels the hysteresis of the force motor and that the summing of forces acting on the spool 14 is accomplished at a high force level and no connections are made to the metering member of the force motor 18.

Figure 2:
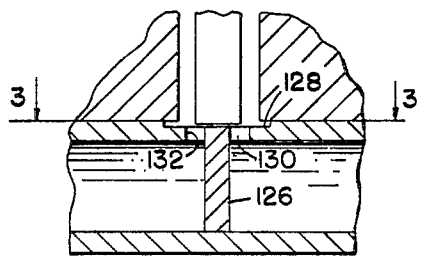
FIGURE 2 is an enlarged view of a modification of a portion of the electrohydraulic servo valve illustrated in FIGURE 1.
Figure 3:
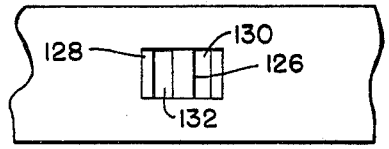
FIGURE 3 is a view of the modified portion of the electrohydraulic servo valve illustrated in FIGURE 2 taken substantially on the line 3—3 in FIGURE 2.

A modification of the area of the valve structure 10 around the nozzle tube nozzles and end of the metering member of the force motor is illustrated in FIGURES 2 and 3. In the modified structure of FIGURES 2 and 3 the nozzle tube is provided with a central partition 126 and a flat 128 is machined on the surface of the nozzle tube adjacent to the end of the metering member of the force motor. In addition, two metering orifices 130 and 132 are machined through the nozzle tube. The end of the metering member in FIGURE 2 is positioned between the metering orifices 130 and 132 whereby when the force motor is actuated the end of the metering member tends to open one of the orifices 130 and 132 and close the other orifice. The operation of the valve would be the same with the orifices of FIGURES 2 and 3 as it would be with the nozzle structure of FIGURE 1.

Figure 4:
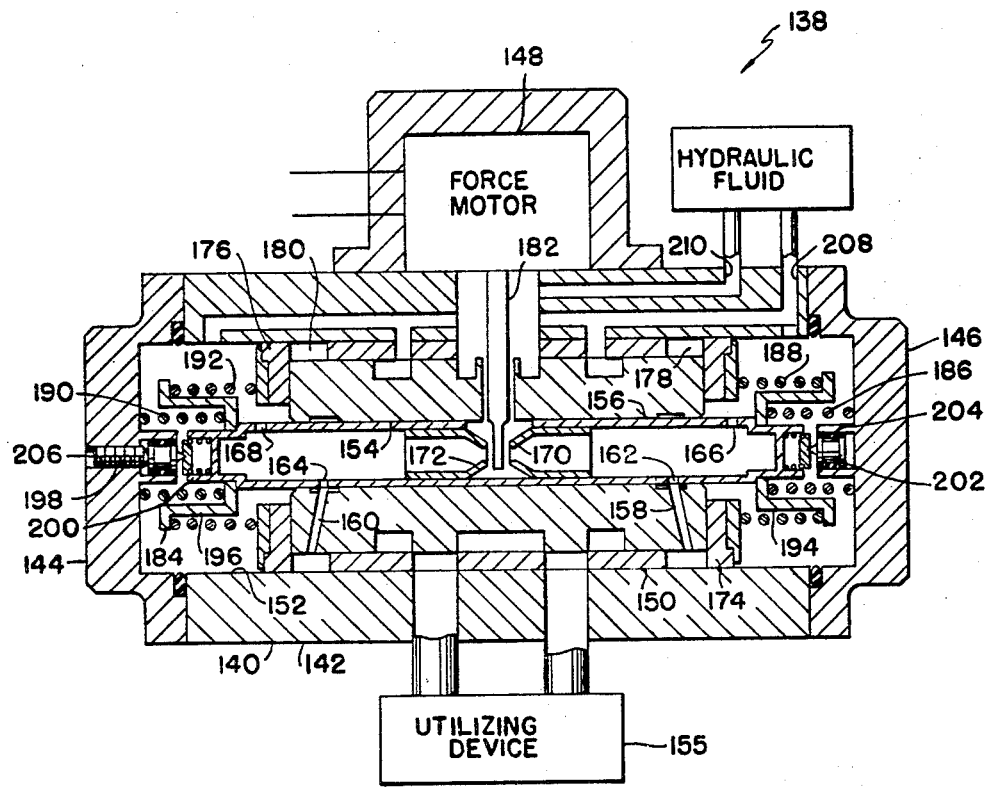
FIGURE 4 is a diagrammatic representation of another modification of the electrohydraulic servo valve illustrated in FIGURE 1.

In the modified electrohydraulic servo valve structure 138 illustrated in FIGURE 4, the valve body member 140 including the body part 142 and end caps 144 and 146 is similar to the body member 12 of the valve 10. Likewise the force motor 148 is similar to the force motor 18. A sleeve 150 is positioned in the passage 152 through the body part 142 and is stationary with respect to the body part. Spool 154 meters hydraulic fluid under pressure to a utilizing device 155 and exhausts hydraulic fluid therefrom on movement of the spool in opposite directions, as before.

In the valve structure 138 the metering is substantially straight through the nozzle tube 156. Passages 158 and 160 are provided at the opposite ends of the spool 154 in alignment with passages 162 and 164 through nozzle tube 156 to connect the annular drive chambers 178 and 180 to the interior of the two halves of the nozzle tube 156 between the fixed orifices 166 and 168 and the metering nozzles 170 and 172. In conjunction with the floating washers 174 and 176 a differential pressure is again produced in the drive chambers 178 and 180 on movement of the metering member 182 of the force motor 148 toward one of the nozzles 170 and 172 and away from the other, so that the spool 154 and nozzle tube 156 are repositioned in accordance with an electric signal fed to the force motor 148 to meter fuel through the valve 138 in accordance with the requirement of the electric signal.

Again in accordance with the invention, the movement of the spool 154 relative to the nozzle tube 156 is amplified by the variable gain structure 184. The variable gain structure 184 includes a pair of springs 186 and 188 and a pair of springs 190 and 192 at the opposite ends of the nozzle tube 156 having ends positioned as shown against the end caps 146 and 144 and the floating washers 174 and 176. The other ends of the springs are abutted against the abutment members 194 and 196 secured to the opposite ends of the nozzle tube 156 as illustrated.

The bias applied to the nozzle tube 156 may be varied by the structure 198 operable between the end caps 144 and 146 and the opposite ends of the nozzle tube 156 as shown. The structure 198 adjacent the end cap 144 comprises the bias spring 200 positioned within the recess 202 in the end of the nozzle tube 156 and the adjustable abutment member 204. The adjustable abutment member 204 is adjusted by means of the screw 206 in the end cap 144 to vary the resilient force applied to the nozzle tube 156 and thus provide centering for the nozzle tube 156. The structure 198 adjacent the end cap 146 differs in that no adjusting screw 206 is provided therefor.

The operation of the electrohydraulic servo valve 138 is similar to that of the servo valve 10 to meter hydraulic fluid through the valve body part 142 between the pressure inlet passage 208 and the return passage 210. Thus again a movement of the nozzle tube 156 caused by a displacement of the metering member 182 of the force motor 148 is imparted to the spool 154 through the springs 186 and 188 at one end and springs 190 and 192 at the other end. Again the movement of the spool 154 is amplified by the springs rates in accordance with Equations 1 and 2 above with springs 186 and 190 having a spring rate of K–1 and springs 188 and 192 having a spring rate of K–2.

Thus, it will be seen that the electrohydraulic servo valve structure 138 of FIGURE 4 also has a variable gain characteristic so that added capacity may be passed through the electrohydraulic servo valve 138 with limited movement of the force motor 148. The gain of the valve 138 may again be determined by the spring rate chosen for springs 186, 188, 190 and 192. In addition the electro hydraulic servo valve 138 again provides summing at a high force level, is symmetrical so that there is no temperature shift, is self aligning and hysteresis compensated.

What we claim as our invention is:

1. An electrohydraulic servo valve comprising a body member having a spool passage therein, a metering spool reciprocally positioned within the spool passage, passage means extending through the body member and around the spool member for metering hydraulic fluid through the body member in accordance with the position of the spool in the spool passage, a nozzle tube passage extending axially of the spool member, a nozzle tube reciprocally mounted in the nozzle tube passage having at least one nozzle therein, restrictor means in the way of the nozzle for producing movement of the nozzle tube in accordance with an electrical signal received by the restrictor means, a source of hydraulic fluid under pressure and hydraulic passages in the body member, the nozzle tube and spool being connected to the source of hydraulic fluid for producing movement of the spool in accordance with movement of the nozzle tube and means connected between the nozzle tube and spool and between the spool and body member to control the movement of the spool in proportion to movement of the nozzle tube.

2. Structure as set forth in claim 1 wherein the means for controlling the movement of the spool in proportion to movement of the nozzle tube comprises a first resilient member connected between the body member and nozzle tube and a second resilient member connected between the nozzle tube and the spool.

3. Structure as set forth in claim 2 wherein the resilient members are spring means having different spring rates.

4. Structure as set forth in claim 3 and further including means connected to the spring means between the nozzle tube and body member for adjusting the spring rate between the body member and nozzle tube.

5. Structure as set forth in claim 4 wherein the means for adjusting the spring rate comprises an adjustable screw threaded through the body member to which the spring means between the nozzle tube and body member is secured.

6. Structure as set forth in claim 4 wherein the means for adjusting the spring rate includes a third spring having a third spring rate positioned between the body member and nozzle tube and means for adjusting the third spring relative to the body member.

7. Structure as set forth in claim 3 wherein the metering means includes a force motor having a predetermined hysteresis and the spring rate of the spring means is such as to cancel the effect of the force motor hysteresis on the servo valve.

8. Structure as set forth in claim 1 wherein an annular abutment is positioned within the opening in the body member adjacent each end of the spool, the spool is provided with annular lands adjacent each end thereof forming pressure chambers with the annular abutments, body member and spool ends, the nozzle tube includes inwardly directed nozzles centrally thereof and inner and outer portions at each end with an opening in the outer portion at the ends of the nozzle tube and with the inner portions communicating with the nozzles and the metering means includes a force motor having a flapper positioned between the nozzles of the nozzle tube, the hydraulic passage means includes a hydraulic passage extending through the body member, the outer portion of one end of the nozzle tube through the spool into the pressure chamber formed between the annular land an annular abutment at the one end of the spool through the body member to the other end of the spool through the spool into the inner portion of the nozzle tube at the other end of the nozzle tube and out of the nozzle at the other end of the nozzle tube past the flapper and a hydraulic passage extending through the body member, the outer portion of the other end of the nozzle tube through the pressure chamber between the annular abutment and annular land at the other end of the spool through the body member through the spool at the other end of the spool into the inner portion of the one end of the nozzle tube and out of the nozzle tube past the flapper and spring means secured between the body member and nozzle tube and between the nozzle tube and body member at each end of the nozzle tube and spool.

9. Structure as set forth in claim 1 and further including a sleeve positioned between the spool and body member, and an annular floating washer positioned at each end of the spool, and the nozzle tube includes inwardly directed nozzles centrally thereof, the metering means includes a force motor having a flapper positioned between the nozzles of the nozzle member and the hydraulic passage means includes hydraulic passages extending through the body member, through the opposite ends of the nozzle tube between the floating washers and sleeve and out of the nozzle past the flapper at each end of the servo valve and an outwardly opening hat-shaped member on each end of the nozzle tube, and spring means operable between the hat-shaped member and floating washer and between the hat-shaped member and body member.

10. Structure as set forth in claim 9 and further including a third spring positioned between the nozzle tube and body member at each end of the nozzle tube and a threaded adjusting screw in the body member at one end of the nozzle tube for adjusting the position of the nozzle tube through the third spring at the one end of the servo valve.

11. An electrohydraulic servo valve comprising a body member having metering passages for hydraulic fluid therein and a spool passage therethrough, a metering spool positioned within the spool passage for metering hydraulic fluid through the body member in accordance with the position of the spool in the spool passage, a nozzle tube extending through the spool and reciprocal with respect thereto, means for producing movement of the nozzle tube in accordance with an electric signal fed to the valve including a force motor having a metering member, the end of which member is positioned radially outwardly of and adjacent the nozzle tube, the nozzle tube having a pair of metering orifices located centrally thereof, each extending partly on opposite sides of and partly under the end of the metering member of the force motor whereby movement of the metering member in either direction axially of the nozzle tube will produce a greater opening of one metering orifice and a closing of the other metering orifice and means operable between the nozzle tube, spool and body member for producing relative movement of the spool and the nozzle tube.

12. Structure as set forth in claim 11 wherein the nozzle tube is cylindrical and a flat is machined in the nozzle tube through which the metering orifices extend and adjacent to which the metering member of the force motor is terminated.

References Cited

UNITED STATES PATENTS

| | | | |
|---|---|---|---|
| 1,125,825 | 1/1915 | Englesson | 137—625.63 |
| 2,618,244 | 11/1952 | Roehm | 137—625.63 |
| 2,771,907 | 11/1956 | Joy | 137—625.63 XR |
| 2,851,997 | 9/1958 | De Mott et al. | 137—625.63 |
| 2,977,985 | 4/1961 | Ericson et al. | 137—625.61 |
| 3,060,969 | 10/1962 | Aslan | 137—625.63 |
| 3,163,180 | 12/1964 | Campbell | 137—625.62 |
| 3,167,632 | 1/1965 | O'Connor | 137—625.64 XR |
| 3,209,782 | 10/1965 | Wolpin et al. | 137—625.62 |

FOREIGN PATENTS

| | | |
|---|---|---|
| 1,272,779 | 8/1961 | France. |

HENRY T. KLINKSIEK, Primary Examiner

U.S. Cl. X.R.

137—625.62

UNITED STATES PATENT OFFICE
CERTIFICATE OF CORRECTION

Patent No. 3,473,548                     October 21, 19

Donald W. Ericson et al.

It is certified that error appears in the above identified patent and that said Letters Patent are hereby corrected as shown below:

In the heading to the drawings, sheets 1 and 2, "D. W. ERICKSON ET AL" should read -- D. W. ERICSON ET AL --; in th heading to the printed specification, line 3, "Donald W. Erickson" should read -- Donald W. Ericson --.

Signed and sealed this 15th day of December 1970.

(SEAL)
Attest:

Edward M. Fletcher, Jr.
Attesting Officer

WILLIAM E. SCHUYLER, JF
Commissioner of Patents